(12) United States Patent
Laraway et al.

(10) Patent No.: US 6,478,261 B2
(45) Date of Patent: *Nov. 12, 2002

(54) SPACECRAFT WITH DEPLOYABLE PANEL ARRAY

(75) Inventors: Peter B. Laraway, Santa Barbara, CA (US); Mark W. Thomson, Ventura, CA (US)

(73) Assignee: TRW Inc., Redondo Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/184,625

(22) Filed: Nov. 2, 1998

(65) Prior Publication Data

US 2002/0074458 A1 Jun. 20, 2002

(51) Int. Cl.⁷ .............................. B64G 1/44; B64G 1/10; B64G 1/22
(52) U.S. Cl. .................................... 244/173; 244/158 R
(58) Field of Search ............................ 244/158 R, 173; 136/245; 16/223, 319

(56) References Cited

U.S. PATENT DOCUMENTS

| | | | |
|---|---|---|---|
| 1,984,092 A | 12/1934 | Soss | |
| 2,021,702 A | 11/1935 | Soss | |
| 3,805,323 A | 4/1974 | Fukui | 16/164 X |
| 3,863,292 A | 2/1975 | Grünert et al. | 16/164 |
| 3,864,786 A | 2/1975 | Salice | 16/163 |
| 3,881,221 A | 5/1975 | Schmidt | 16/163 |
| 3,991,437 A | 11/1976 | Friederichs et al. | 16/139 |
| 4,332,053 A | 6/1982 | Salice | 16/370 |
| 4,572,081 A * | 2/1986 | Copeland | 108/11 |
| 4,736,491 A | 4/1988 | Mertes | 16/358 |
| 4,780,929 A | 11/1988 | Burns et al. | 16/349 |
| 4,827,569 A | 5/1989 | Mertes | 16/288 |
| 4,875,252 A | 10/1989 | Falconer et al. | 16/288 |
| 4,928,350 A | 5/1990 | Morgan | 16/297 |
| 5,014,936 A * | 5/1991 | Nauck | 244/158 R |
| 5,044,044 A | 9/1991 | Young et al. | 16/323 |
| 5,233,726 A | 8/1993 | Cress | 16/336 |
| 5,400,987 A * | 3/1995 | Ziavras | 244/173 |
| 5,459,982 A | 10/1995 | Long | 53/529 |
| 5,564,884 A | 10/1996 | Farsai | 414/540 |
| 5,653,407 A * | 8/1997 | Bertheux et al. | 244/173 X |
| 6,010,096 A * | 1/2000 | Baghdasarian | 244/173 |
| 6,016,999 A * | 1/2000 | Simpson et al. | 244/158 R |

FOREIGN PATENT DOCUMENTS

| | | |
|---|---|---|
| EP | 0 158 604 | 10/1985 |
| EP | 0 352 912 | 1/1990 |

* cited by examiner

*Primary Examiner*—Robert P. Swiatek
(74) *Attorney, Agent, or Firm*—Knobbe Martens Olson & Bear LLP

(57) ABSTRACT

A spacecraft, such as a satellite, comprises a panel array including a plurality of panels that are rotatably coupled to one another. The panel array is movable between a folded state and an extended state. In the folded state, the panels are stacked atop one another. In the extended state, the panels are positioned such that active surfaces of the panels are aligned within a common plane. A plurality of hinge mechanisms preferably rotatably couple the panels to one another. The hinge mechanisms are configured to move the panel array from the folded state to the extended state without interfering with the active surfaces of the panels when the panel array is extended.

34 Claims, 17 Drawing Sheets

SPACECRAFT WITH DEPLOYABLE PANEL ARRAY

BACKGROUND OF THE INVENTION

1. Field of the Invention

The present invention relates to spacecraft. More particularly, the present invention relates to a satellite having a plurality of flat panels that are deployable to a precise coplanarity wherein the front surfaces of the panels are unmarred by protruding hardware.

2. Description of the Related Art

Space satellites often include a foldable panel array comprised of a plurality of flat panels, such as solar panels or antenna panels. The individual panels each have a planar front or active surface upon which planar functional components, such as solar cells, reflectors, or antenna elements, are mounted. The active surfaces of the panels are desirably maintained smooth and unmarred by any projections, which tend to degrade the performance of the panels. Toward this end, any hardware devices, such as structural supports and hinge mechanisms, are desirably mounted on a rear surface of the panels so that they do not interfere with the planarity of the active surfaces.

The panel array may be maintained in a stowed or folded state wherein the individual panels are folded over one another in an accordion-like fashion. In the folded state, the surface of one panel is juxtaposed with a surface of an adjacent panel so that the panels are stacked atop one another so that the panel array consumes less space. The panel array is preferably maintained in the folded state prior to use and also during launch of the spacecraft in order to conserve precious cargo space within the spacecraft launch vehicle.

The panel array transitions to a deployed or extended state after the satellite reaches orbit. In the deployed state, the individual panels are disposed in an edge-to-edge fashion such that the active surfaces of the panels are aligned in a common plane. The active surfaces of the individual panels thereby collectively form an enlarged active surface for the panel array. During the transition from the folded state to the deployed state, the individual panels are each typically rotated outward using a hinge assembly that is disposed between adjacent panels.

Unfortunately, current hinge hardware tends to interfere with the performance of the active surfaces of the panel array. Current hinge assemblies typically comprise pin hinges that define a fixed axis of rotation for the panels. Consequently, depending on the manner in which the panel array is folded, a portion of the pin assembly protrudes upwardly from the active surface of the panels after the panels have been deployed. As mentioned, such protrusions or irregularities in the active surface of the panel array degrades the performance of the array.

There is therefore a need for a spacecraft panel array that may be deployed to an extended state wherein the coplanarity of the active surfaces is unmarred by hardware such as hinge assemblies. Additionally, the panels are desirably held tightly together in the extended state, such as through the application of a high preload that maintains the structural continuity and rigidity of the panel array.

SUMMARY OF THE INVENTION

The aforementioned needs are satisfied by the present invention, which comprises a spacecraft having a panel array comprised of a plurality of panels. The panel array is movable between a folded state and a deployed or extended state. In the folded state, the panels are folded over one another in a juxtaposed relationship. In the extended state, the panels are aligned edge-to-edge such that the front or active surfaces of the panels are disposed within a common plane. The panel array includes at least one hinge assembly disposed between each of the panels in the array. The hinge assemblies are configured to rotate the panel array from the folded state to the extended state. Advantageously, the hinge assemblies do not intersect any portion of the active surface of the array when the array is in the extended state. The hinge assemblies therefore do not interfere with the performance of the active surface.

The panel array also preferably includes a latching mechanism for rigidly securing the panel array in the extended state and maintaining the coplanarity of the panels when extended. The latching mechanism comprises at least one latch on one panel and a hook on an adjacent panel. The latch couples with the hook after the array has been extended to thereby exert a panel-to-panel preload that establishes structural continuity between the panels and prevents the array from moving to the folded position after deployment. In a preferred embodiment, a plurality of latches are disposed in an aligned relationship with a single actuator coupled to each of the latches. The single actuator is desirably configured to transition each of the latching members from a cocked position to a latched position so that each of the latches simultaneously couples with each of the hooks.

In one aspect of the invention, there is disclosed a hinge mechanism for deploying a system of satellite panels comprised of at least a first panel and a second panel. The hinge preferably comprises a pair of arms each rotatably coupled at opposite ends to the first panel and the second panel. The pair of arms are configured to apply a force to the first and second panels so that the first panel rotates relative to the second panel about a non-fixed axis of rotation. The hinge mechanism additionally comprises at least two latch mechanisms coupling the first panel to the second panel. The latch mechanisms are each movable to a locked state wherein the latch mechanisms secure the first and second panels in a deployed position. An actuator is coupled to each of the latch mechanisms and configured to move the latch mechanisms to the locked state.

Another aspect of the invention relates to a deployable mechanism for use in space. The mechanism comprises at least a first panel defining a front surface and a rear surface and at least a second panel defining a front surface and a rear surface. The first and second panels are rotatably coupled to one another and moveable between a first position wherein the front surfaces are juxtaposed and a second position wherein the front surfaces are aligned within a common plane. The mechanism additionally comprises at least one hinge assembly rotatably coupling the first panel to the second panel. The hinge assembly is positioned entirely outside the common plane when the first and second panels are in the second position. Desirably, a motor is drivingly coupled to the hinge assembly.

BRIEF DESCRIPTION OF THE DRAWINGS

These and other features of the invention will now be described with reference to the drawings of a preferred embodiment, which are intended to illustrate and not to limit the invention, and in which.

DETAILED DESCRIPTION OF THE PREFERRED EMBODIMENT

Figure 1:
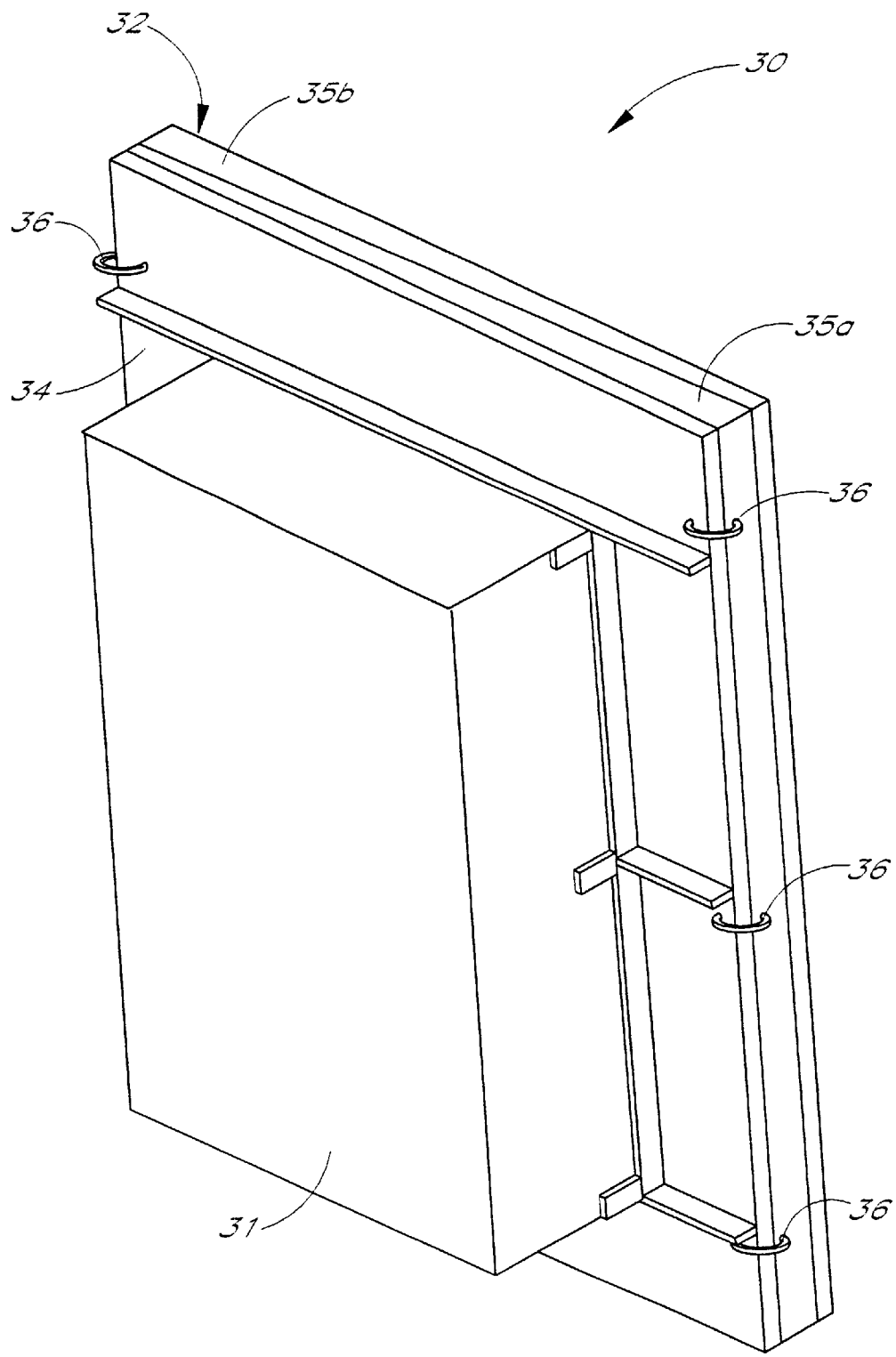
FIG. 1 is a schematic perspective view of a spacecraft comprising a panel array in a folded state.
Figure 2:
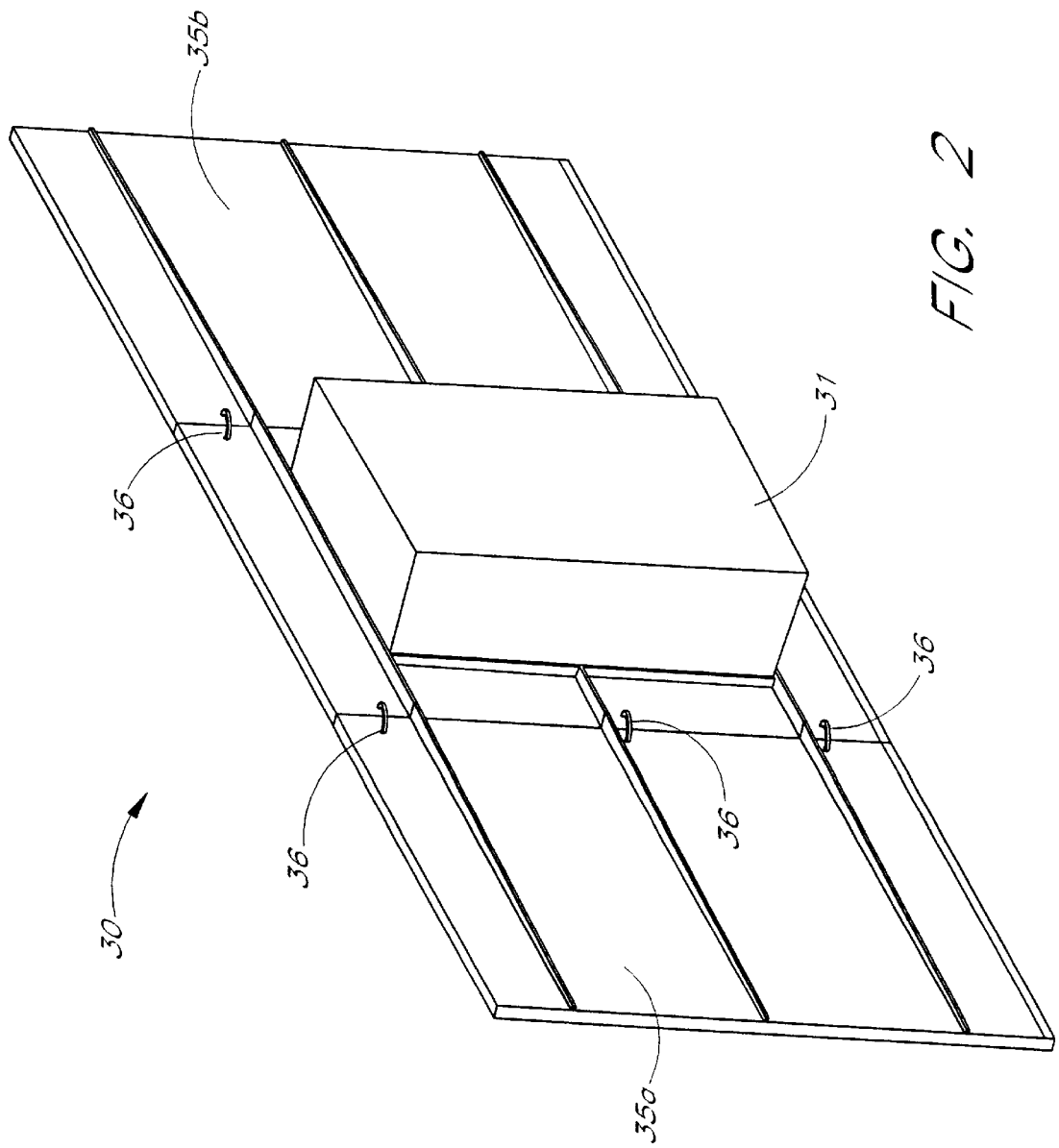
FIG. 2 is a schematic perspective view of the spacecraft with the panel array in a deployed state.

FIGS. 1 and 2 are schematic perspective views of a spacecraft, such as a satellite 30, comprised of a main body 31 and a panel array 32 attached thereto. In the articulated embodiment, the panel array 32 is comprised of three panels including a center panel 34 and a pair of outer panels 35a,b (collectively referred to as "outer panels 35") that are disposed on opposite sides of the center panel 34 when the panel array 32 is in a deployed state, as best shown in FIG. 2. As used herein, the term "center panel" is used with reference to a panel having panels disposed on opposite sides thereof. The inner and outer panels 34, 35 may comprise any well known functional panels that are used in conjunction with spacecraft, such as solar panels, antenna panels, etc. Although in the illustrated embodiment the panel array 32 comprises three panels, it will be appreciated that the panel array 32 could comprise any number of two or more panels. Additionally, the satellite 30 may be equipped with additional panel arrays 32, such as combinations of solar panel and antenna panel arrays.

The panel array 32 is movable between a stowed or folded state and a deployed or extended state. With reference to FIG. 1, in the folded state, the inner and outer panels 34, 35 are folded over one another in an accordion-like manner so that the panels 34, 35 are stacked and positioned flatly against the main body 31. With reference now to FIG. 2, in the deployed state, the outer panels 35 are folded outward from the center panel 34. The panels 34, 35 are preferably aligned edge-to-edge such that the panels 34, 35 are disposed within a common plane. The panel array 32 preferably transitions from the folded to the extended state using a set of hinge assemblies 36 that are disposed at the adjacent edges of the panels 34, 35 and configured to rotate the panels about a non-fixed axis of rotation, as described more fully below. The hinge assemblies 36 are illustrated schematically in FIGS. 1 and 2 and described in detail below.

Figure 3:
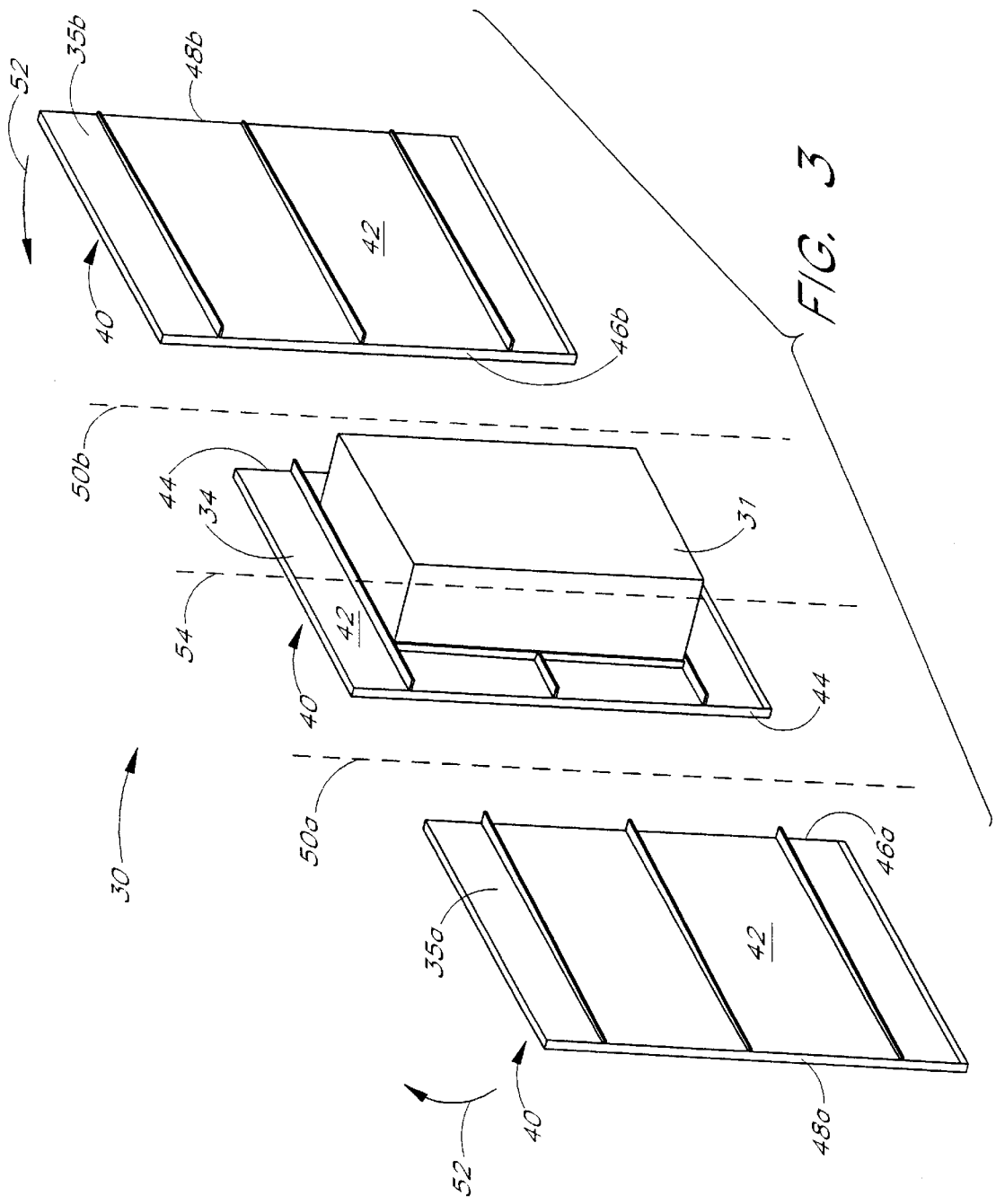
FIG. 3 is an exploded perspective view of the spacecraft in the deployed state.

FIG. 3 is an exploded view of the satellite 30 with the panel array 32 in the extended state. Each of the panels 34, 35 preferably comprises a flat structure having a pair of opposed surfaces including a planar front or active surface 40 and a rear surface 42 opposed thereto. In the folded state, the active surface 40 of one of the panels is juxtaposed with the active surface of another panel. For example, the center panel 34 is juxtaposed with the active surface 40 of at least one of the outer panels 35. When the panel array 32 is in the extended state, the active surfaces 40 are preferably aligned within a smooth, uninterrupted common plane. As used herein, an uninterrupted plane is a plane containing no projections or irregularities.

As shown in FIG. 3, the center panel 34 defines a pair of opposed, straight outboard edges 44. The rectangular outer panels 35a,b have straight outboard edges 48a,b, respectively, and opposed, straight inboard edges 46a,b, respectively, that are preferably disposed parallel to and adjacent the outboard edges 44 of the center panel 34. Although the panels 34a,b are shown as rectangular, those skilled in the art will appreciate that the particular size and shape of the panels 34 may vary.

With reference to FIG. 3, each of the outer panels 35a,b is configured to rotate relative to the center panel 34 about respective, non-fixed axes of rotation 50a,b, as exhibited by the curved directional arrows 52. The locations of the axes of rotation 50a,b migrate as the panel array transitions between the folded state and the deployed state but preferably remains in a parallel relationship with the outboard edges 44 of the center panel 34. The "instantaneous axis of rotation" is the axis of rotation of a panel at any particular point in time during the transition of the panel array between the folded and deployed state.

As the panel array 32 transitions to the folded state, the hinge assemblies 36 preferably rotate the outer panel 35a about the axis 50a to a position wherein its active surface 40 is juxtaposed with the active surface 40 of the center panel 34. The hinge assemblies 36 also rotate the outer panel 35b to a position wherein its active surface 40 is flatly juxtaposed with the rear surface 42 of the outer panel 35a. The outer panel 35a is therefore sandwiched between the outer panel 35b and the center panel 34 when the panel array 32 is in the folded state, as shown in FIG. 1. As mentioned, the panel array 32 could also include more than three panels wherein the additional panels are also configured to fold together in an accordion-like manner.

For reference purposes, a medial reference line 54 is defined as a line that extends midway through the center panel 34 in a direction parallel to the axes of rotation 50 of the outer panels 35. The terms "outboard" and "inboard" are used herein with reference to the medial reference line 54. The "outboard" direction refers to a direction moving perpendicularly away from the medial reference line 54 along a plane parallel to a plane defined by the extended panels 34, 35. The "inboard" direction refers to a direction moving perpendicularly toward the medial reference line 54 in a plane parallel to that of the extended panels 34, 35.

Figure 4:
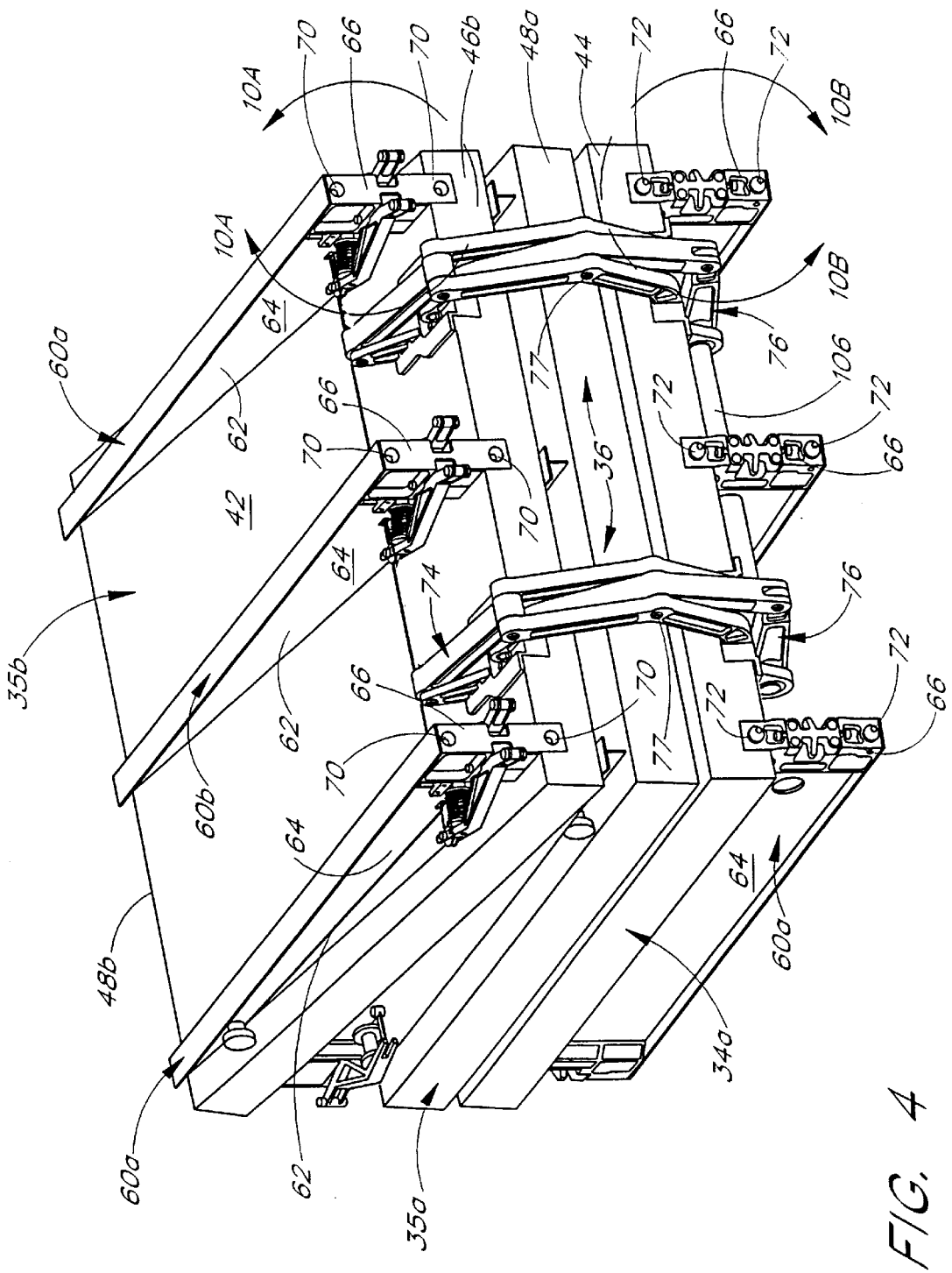
FIG. 4 is a detailed perspective view of the panel array in the folded state.
Figure 5:
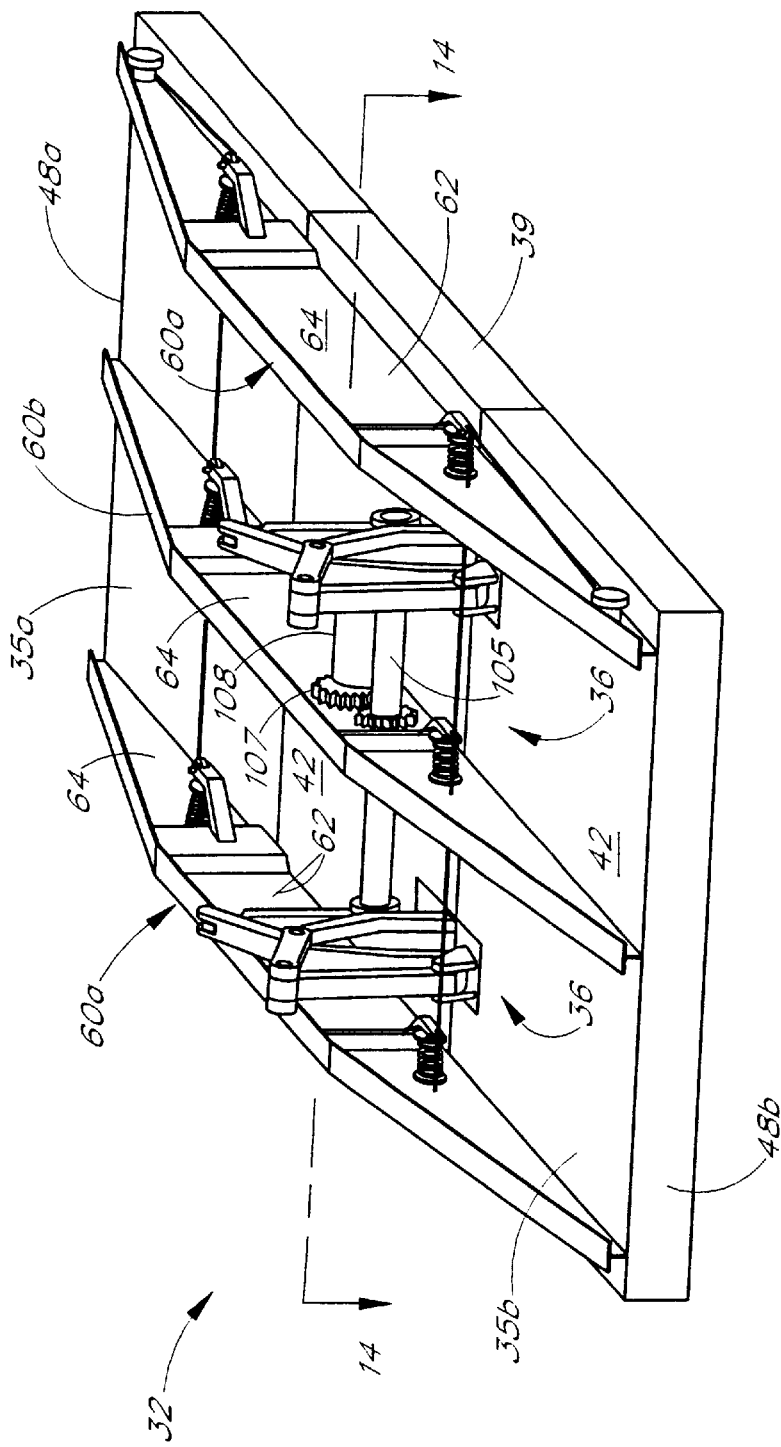
FIG. 5 is a detailed perspective view of the panel array in the deployed state.

FIGS. 4 and 5 are detailed perspective views of the panel array 32 in the folded state and in the extended state, respectively. At least one, and preferably set of elongated ribs or struts 60a,b are preferably disposed on the rear surfaces 42 of each of the panels 34, 35 for providing structural support thereto. In the illustrated embodiment, the struts 60 include a pair of side struts 60a that extend in the inboard-outboard directions along the side edges of the panels 34, 35. A center strut 60b extends in the inboard-outboard direction between the side struts 60a. Each of the struts 60 preferably comprises a vertical portion 62 having a "T"-shaped cross-section that defines opposing, flat side surfaces 64 and a generally flat end surface 66 (FIG. 4). Additionally, the vertical portions 62 of the struts 60 on the outer panels 35 are tapered to gradually increase in height moving in the inboard direction so that the struts 60 provide increased structural support at the center of the panel array 32. The shape of the struts 60 is not limited to that shown in FIGS. 4 and 5.

With reference to FIG. 5, the side struts 60a and the center struts 60b of one panel co-axially align with the side struts 60a and the center struts 60b of an adjacent panel when the panel array 32 is fully extended. Three continuous struts 60 therefore extend from the outboard edge 48a of the outer panel 35a to the outboard edge 48b of the outer panel 35b when the panel array 32 is fully extended.

With reference again to FIG. 4, an interlocking alignment interface preferably exists between the flat end surfaces 66 to facilitate proper alignment of the struts 60 of the center panel 34 with the struts 60 of the outer panels 35 when the array 32 transitions to the extended state. In a preferred embodiment, at least one female member, such as a cup-shaped cavity 70, is located on the flat end surface 66 of each of the struts 60 of the outer panels 35. At least one correspondingly-shaped male member, such as a cone 72, extends outwardly from the flat end surfaces 66 of the struts 60 of the center panel 34. The cones 72 are configured to mate with the correspondingly-shaped cavities 70 when the panels 34, 35 are extended so that the struts 60 align properly. Although the cones 72 are shown on the center panel 34 and the cavities 70 on the outer panels 35, it will be appreciated that the positions of the male and female members may be swapped between the struts 60 of the center panel 34 and the struts 60 of the outer panels 35. The male-female interface may also take on any of a wide variety of interlocking shapes, although the tapered cone shape facilitates a smooth guidance of the male member into the female member.

With reference to FIGS. 4 and 5, the hinge assemblies 36 are disposed generally between the outboard edges 44 of the center panel 34 and the inboard edges 46 of the adjacent outer panels 34b. For clarity of illustration, in FIG. 5 the hinge assemblies 36 are not shown at the juncture between the outer panel 35a and the center panel 34, although it will be appreciated that hinge assemblies are desirably located at each panel-to-panel juncture in the panel array 32.

The hinge assemblies 36 are configured to provide a swinging or deploying force to the outboard panels 35 for rotating the outboard panels 35 from the folded state (FIG. 3) to the deployed state (FIG. 4). Advantageously, the hinge assemblies 36 do not interfere with or obstruct the coplanarity of the active surfaces 40 of the panels 34 when the panel array 32 is extended. Toward this end, the hinge assemblies 36 are preferably configured such that no portion of the hinge assembly necessarily intersects the instantaneous axis of rotation 50a,b of the outer panels 35. The rotation of the panels 35 therefore occurs about an instantaneous axis where no hinge hardware is necessarily present, as described more fully below with reference to FIGS. 13–16.

With reference to FIGS. 4 and 5, each hinge assembly 36 preferably comprises an outboard arm 74 and an inboard arm 76 which are each rotatably linked at opposite ends to the center panel 34 and the outer panel 35b. The outboard arm 74 and the inboard arm 76 are also rotatably linked to one another at a pivot connection 77 to allow force to be transferred therebetween. The coupling of the arms in this manner allows the inboard and outboard arms 74, 76 of the hinge assembly 36 to provide separate swinging forces to the center panel and outer panels 34, 35 and thereby move the panel array 32 from the folded state to the extended state, as described in more detail below with reference to FIGS. 13–16. The outboard arm 74 and inboard arm 76 are each preferably comprised of a plurality of movable components or links of predetermined shape, as described in detail below with reference to FIGS. 6–9. In the illustrated embodiment, two hinge assemblies 36 are disposed between the center panel 34 and the outer panel 34a, although the number and location of hinge assemblies 36 may vary.

Figure 4A:
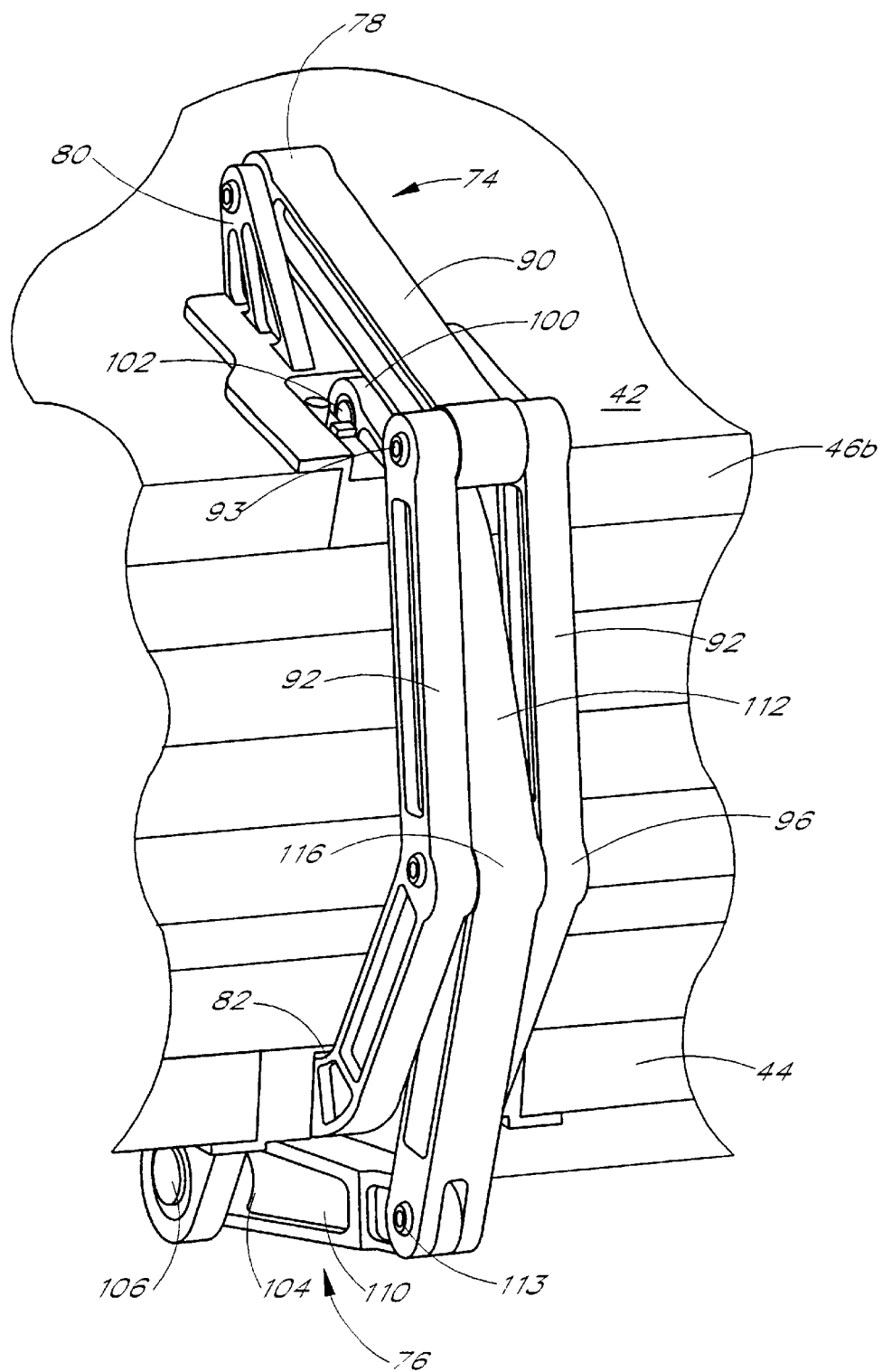
FIG. 4A is an enlarged view of a hinge assembly used with the panel array.
Figure 6:
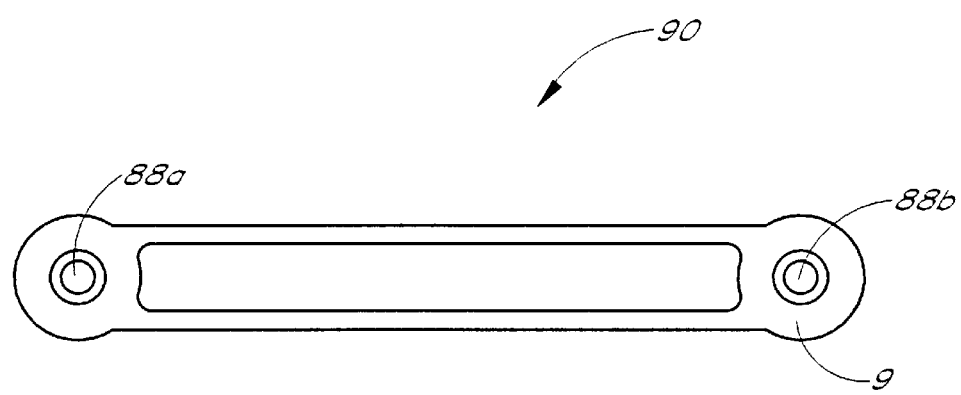
FIG. 6 is a side plan view of a first link of an outboard arm of the hinge assembly.

FIG. 4A is an enlarged view of one of the hinge assemblies 36 in the folded position. The outboard arm 74 is preferably rotatably coupled at a first end 78 to a bracket 80 that is fixedly mounted on the rear surface 42 of the outer panel 35b. A second end 82 of the outboard arm 74 is rotatably coupled to a pin assembly (not shown) that is disposed adjacent the outboard edge 44 of the center panel 34. The outboard arm 74 preferably comprises a straight first link 90 and a pair of bent or contoured second links 92 rotatably attached thereto. The second links 92 are parallel and on opposing sides of the first link 90. The first link 90 is rotatably coupled at one end to the bracket 80 and at a second end to the second links 92 via a pin connection 93. FIG. 6 is a side plan view of the first link 90, which preferably comprises a straight rod 90. The first link 90 preferably has apertures 88a,b on opposite ends thereof for rotatably coupling the first link 90 to the bracket 80 on the outer panel 35 and to the second links 92 via the pin connection 93.

Figure 7:
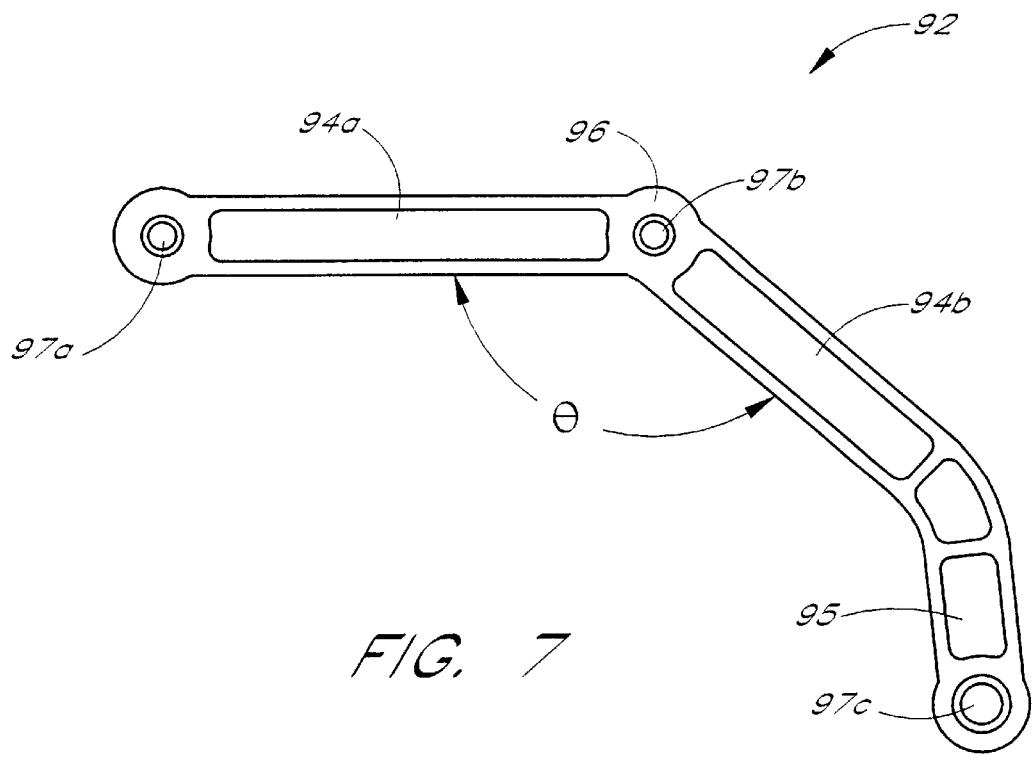
FIG. 7 is a side plan view of a second link of the outboard arm of the hinge assembly.

FIG. 7 is a side plan of an embodiment of one of the second links 92 of the outboard arm 74. The second links 92 each comprise a pair of straight segments 94a,b that are connected at a bend 96 so as to define an angle θ therebetween. A straight coupling segment 95 extends at an angle from the end of the straight section 94b. Preferably, apertures 97a,c extend through the second link 92 at opposite ends thereof. The apertures 97a,c provide means for rotatably coupling the second link 92 to the first link 90 and to the pin assembly on the inboard edge 44 of the center panel 34. An aperture 97b also extends through the second link 92 at the bend 96 for rotatably coupling the outboard arm 74 to the inboard arm 76 at the pivot connection 77 (FIG. 4).

With reference again to FIG. 4A, the inboard arm 76 also extends between the rear surface 42 of the center panel 34 and the rear surface 42 outer panel 35. A first end 100 of the inboard arm 76 is rotatably coupled to a pin assembly 102 that is disposed on the rear surface 42 of the outer panel 35 adjacent the inboard edge 46b. A second end 104 of the inboard arm 76 is preferably coupled to the rear surface 42 of the center panel 34 via a drive shaft 106 for driving the hinge assemblies 36 by providing a torque thereto. As best shown in FIG. 5, the drive shaft 106 preferably extends between the hinge assemblies 36 along a direction transverse to the outboard direction. A motor 108 (FIG. 5) is preferably mounted on the center panel 34 and drivingly coupled to the drive shaft 96 via a gear assembly 107 for providing power thereto. Each hinge assembly that is used is preferably drivingly coupled to a motor in a similar manner.

Figure 8:
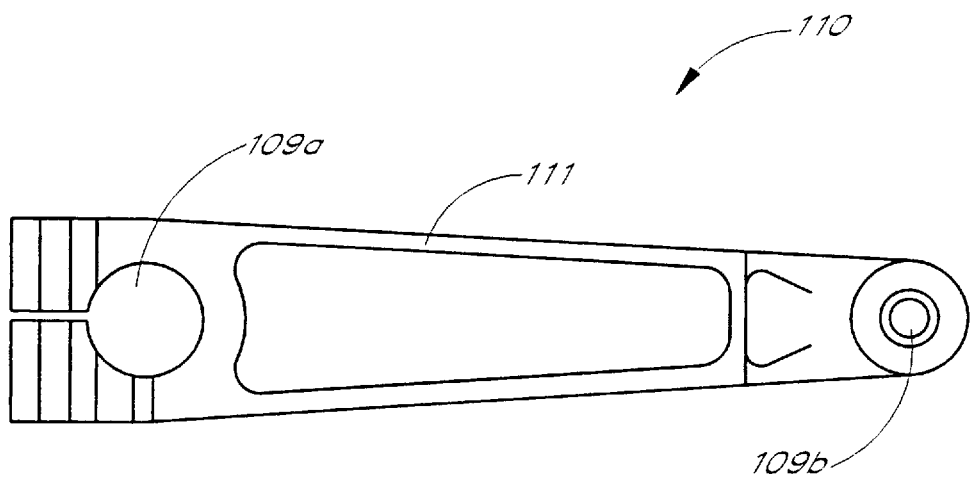
FIG. 8 is a side plan view of a first link of an inboard arm of the hinge assembly.

With reference to FIG. 4A, the inboard arm 76 preferably comprises a first link 110 and a bent or contoured second link 112 each having shapes corresponding to the shapes of the first link 90 and second link 92, respectively of the outboard arm 74. The first and second links 110, 112 of the inboard arm 76 are preferably connected in an opposite order with respect to the first and second links 90, 92 of the outboard arm 74. The first link 110 is fixedly coupled at one end to the drive shaft 106 and at an opposite end to the second link 112 via a pin connection 113. With reference to FIG. 8, the first link 110 preferably comprises a straight, tapered rod 111 having apertures 109a,b on opposite ends thereof. The aperture 109a is configured to couple with the drive shaft 96 and the aperture 109b is configured to couple with a corresponding aperture 122a (FIG. 9) on the second link 112 via the pin connection 113.

Figure 9:
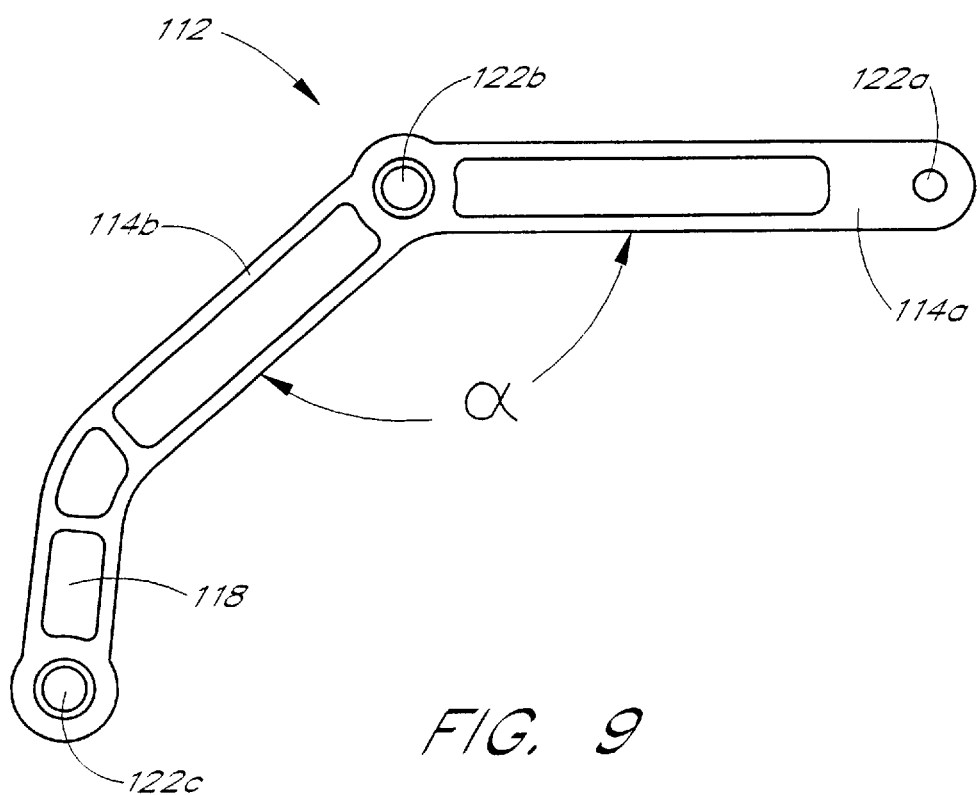
FIG. 9 is a side plan view of a second link of the inboard arm of the hinge assembly.

With reference to FIG. 9, the second link 112 preferably comprises a pair of straight segments 114a,b that are connected at a bend 116 so as to define an angle a therebetween. A straight coupling section 118 extends from the end of the straight section 114b. A pair of apertures 122a,c preferably extend through opposite ends of the second link 112. The apertures 122a,c provide means for coupling the second link 112 to the first link 110 and the outer panel 35b. An aperture 122b also extends through the second link 112 at the bend 116 for coupling the second link 112 to the second link 92 of the outboard arm 74.

In the illustrated embodiments, the shape of the links 110, 112 of the inboard arm 76 correspond to the shapes of the links 90, 92 of the outboard arm 74 so that the hinge assembly 36 is generally symmetric about the pivot connection 77. However, the shape of the links of the inboard arm 76 and outboard arm 74 may be varied to control the operation of the hinge assemblies 36. For example, the lengths of any of the links 90, 92, 110, 112 or the angles θ or α may be changed to increase or decrease the clearance between the arms 74, 76 and the panels 34, 35 or parts mounted thereon. Additionally, the relative locations of the points of connection between the inboard arm 76 and the outboard arm 74 may be varied to selectively control the trajectory that the panels 35 follow when transitioning between the folded state and the deployed state. The quantity of links or arms per each hinge assembly may also be changed to vary the strength or stability of the hinge assemblies.

The panel array 32 preferably also includes a latching interface that secures the relative positions of the panels 34, 35 when the array 32 is disposed in the extended state. The latching mechanism is best described with reference to FIGS. 10A and 10B, which are enlarged views of the portions of the panel array 32 within lines 10A and 10B, respectively, of FIG. 4. The latching mechanism preferably comprises at least one movable latch 132 (FIG. 10A) that is mounted on each of the side surfaces 64 of the struts 60 of the outer panel 35. The latches 132 are each configured to mate with one of a plurality of corresponding hook assemblies 134 (FIG. 10B) that are mounted on each of the end surfaces 66 of the struts 60 of the center panel 34. The latches 132 and hook assemblies 134 are positioned such that each of the latches 132 will latch onto to the corresponding hook assemblies 134 when the panel array 32 is extended. The latches 132 and the hook assemblies 134 may be disposed on either the outer panel 35 or the center panel 34.

As described in detail below, each latch 132 is preferably movable between a cocked position wherein the latch 132 is positioned to receive the hook assembly 134, and a latched position wherein the latch 132 latches onto the hook assembly 134. The latch 132 preferably remains in the cocked position when the panel array 32 is stowed and then transitions to the latched position after the panel array 32 is extended.

Figure 10A:
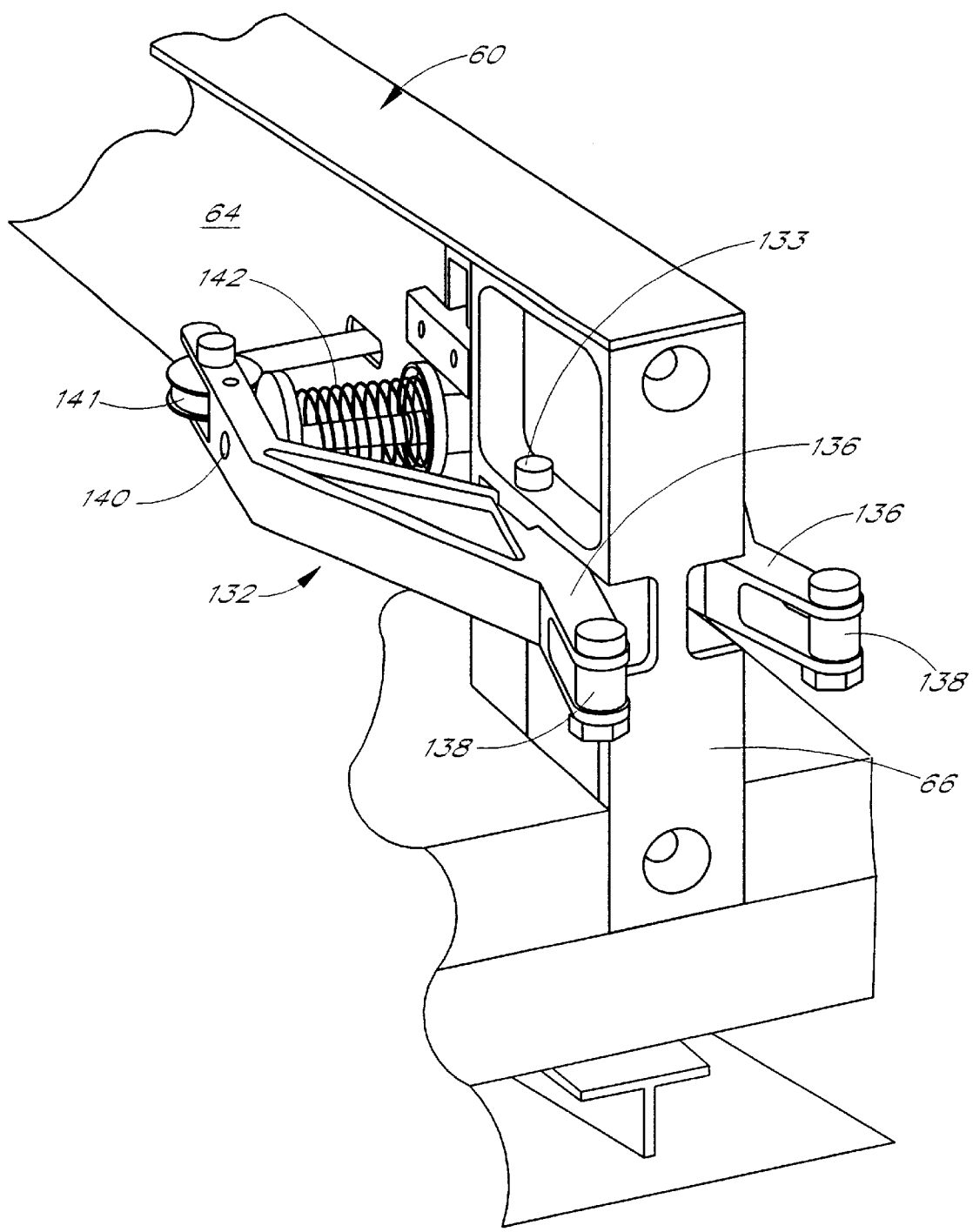
FIG. 10A is an enlarged view of the portion of the panel array within line 10A of FIG. 4.

FIG. 10A shows a latch 132 in a cocked position. Each latch 132 preferably comprises a raised structure that extends outwardly from the side surface 64 of the strut 60 and which is pivotally mounted thereto via a pin 133. The latch 132 has an elongated protruding end 136 that extends past the end surface 66 of the strut 60 in the inboard direction. A latch member, such as a roller 138, is preferably disposed on the inboard tip of the protruding end 136. The latch 132 also has a raised end 140 that is opposed to the protruding end 136 and raised outwardly from the side surface 64. A pulley 141 is rotatably mounted on the raised end 140 of the latch 132.

The pin 133 allows the latch 132 to be pivoted between a position wherein the raised end 140 is angled toward the strut 60, as shown in FIG. 10A, and a position wherein the raised end 140 is extended away from the strut 60. Preferably, a biasing member, such as a spring 142, is compressibly mounted between the raised end 140 of the latch 132 and the side surface 64 of the strut 60. The spring 142 exerts an outward force against the raised end 130 to bias the raised end 140 away from the strut 60.

Figure 10B:
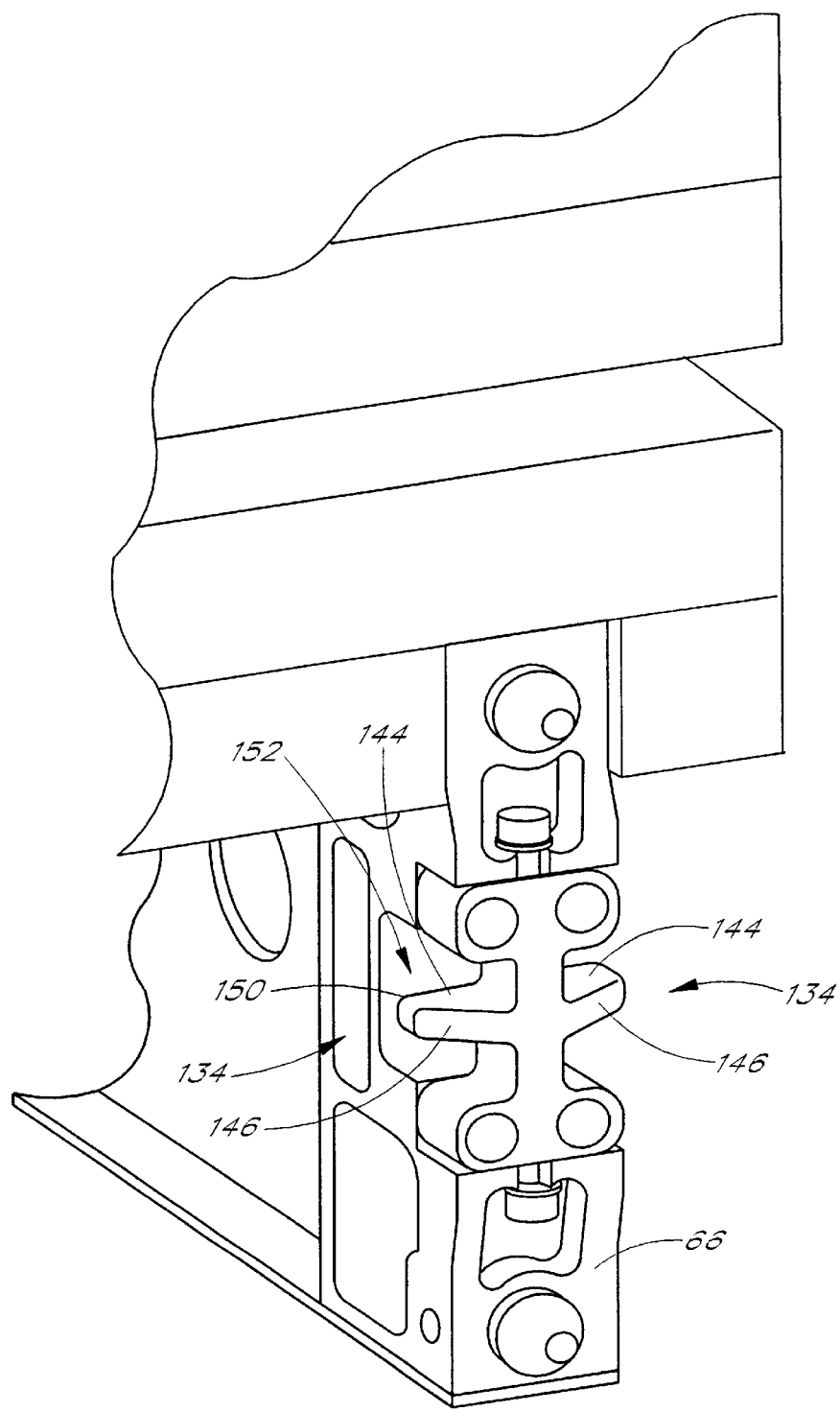
FIG. 10B is an enlarged view of the portion of the panel array within line 10B of FIG. 4.

With reference to FIG. 10B, each hook assembly 134 is disposed on the flat end surfaces 66 of the struts 60 on the center panel 34. Each hook assembly 123 preferably comprises a raised block 144 that defines an outboard-facing inclined surface 146 and an opposed, inboard-facing flat abutment surface 150. The abutment surface 150 defines a space 152 within the strut 60. The space 152 is preferably dimensioned to receive therein the roller 138 that is mounted on the protruding end 136 of the corresponding latch 132. The hook assembly 134 is preferably disposed such that the roller 138 abuts and slides along the inclined surface 132 as the panel array 32 moves to the extended state. The roller 138 sits within the space 152 when the panel array 32 is fully extended, as described below. The panel array 32 preferably has one hook assembly 134 for every latch 132.

Figure 11:
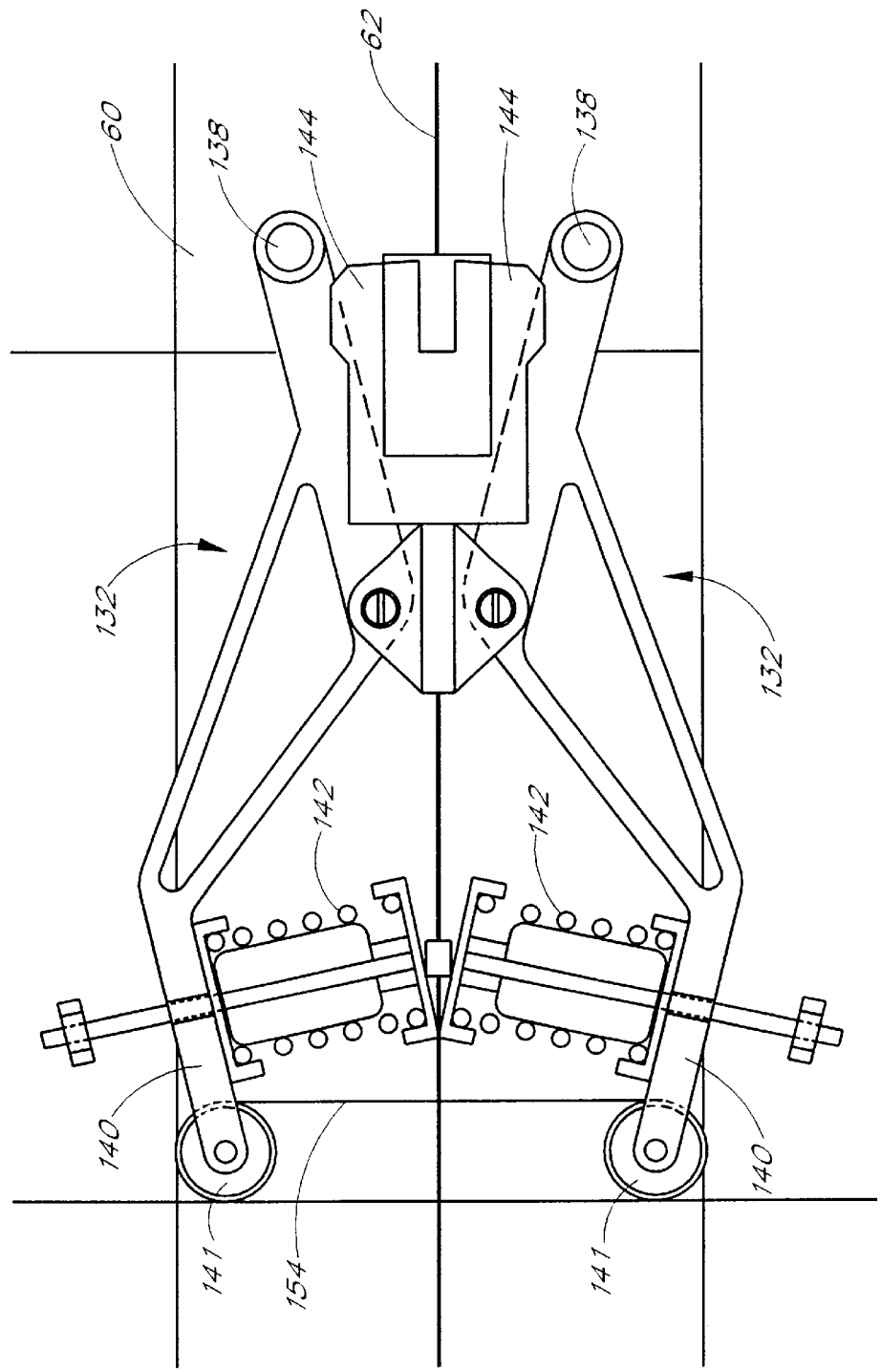
FIG. 11 is a schematic view of a latch assembly of the panel array with the latch assembly in a cocked position.
Figure 12:
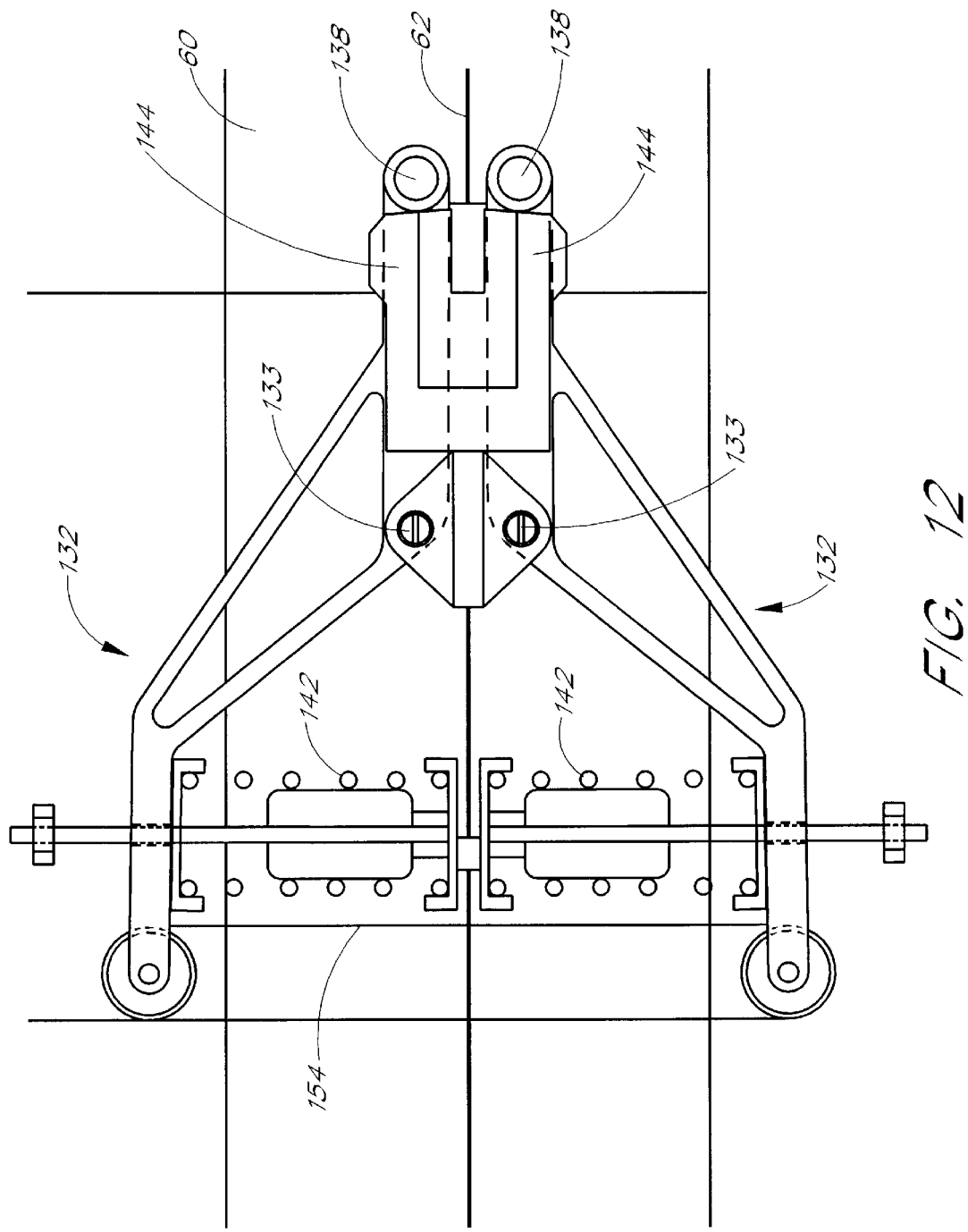
FIG. 12 is a schematic view of a latch assembly of the panel array with the latch assembly in a latched position.

FIGS. 11 and 12 are schematic plan views of the latches 132 looking downwardly at one of the struts 60. FIG. 11 shows the latches 132 in the cocked or unlatched state and FIG. 12 shows the latches 132 in the latched state wherein they are coupled to the hook assembly 134. With reference to FIG. 11, in the cocked state the latches 132 are disposed with the raised portions 140 pivoted toward the vertical portion 62 of the strut 60. Preferably, a retainer member, such as a band 154, retains the latches 132 in the cocked position such that the springs 142 are maintained in a compressed state. After the panel array has reached the extended state, the band 154 is cut or released, such as through a pyrotechnic device, as will be known to those skilled in the art.

With reference to FIG. 12, when the band 154 is released the springs 142 urge the latches 32 to pivot about the pin 133 and move to the locked position. In the locked position, the rollers 138 sit within the space 152 (FIG. 10B) defined by the abutment surface 150 of the hook assembly 134.

Preferably, the protruding end 136 of the latch 132 is dimensioned such that the rollers 138 tightly abut the blocks 144 and exert a high preload between the mating surfaces of the panels 34, 35. The preload advantageously increases the panel-to-panel rigidity of the panel array 32 and the structural continuity of the panel array 32. The latching mechanisms are therefore preferably disposed at each of the mating surfaces of the panels.

Figure 13:
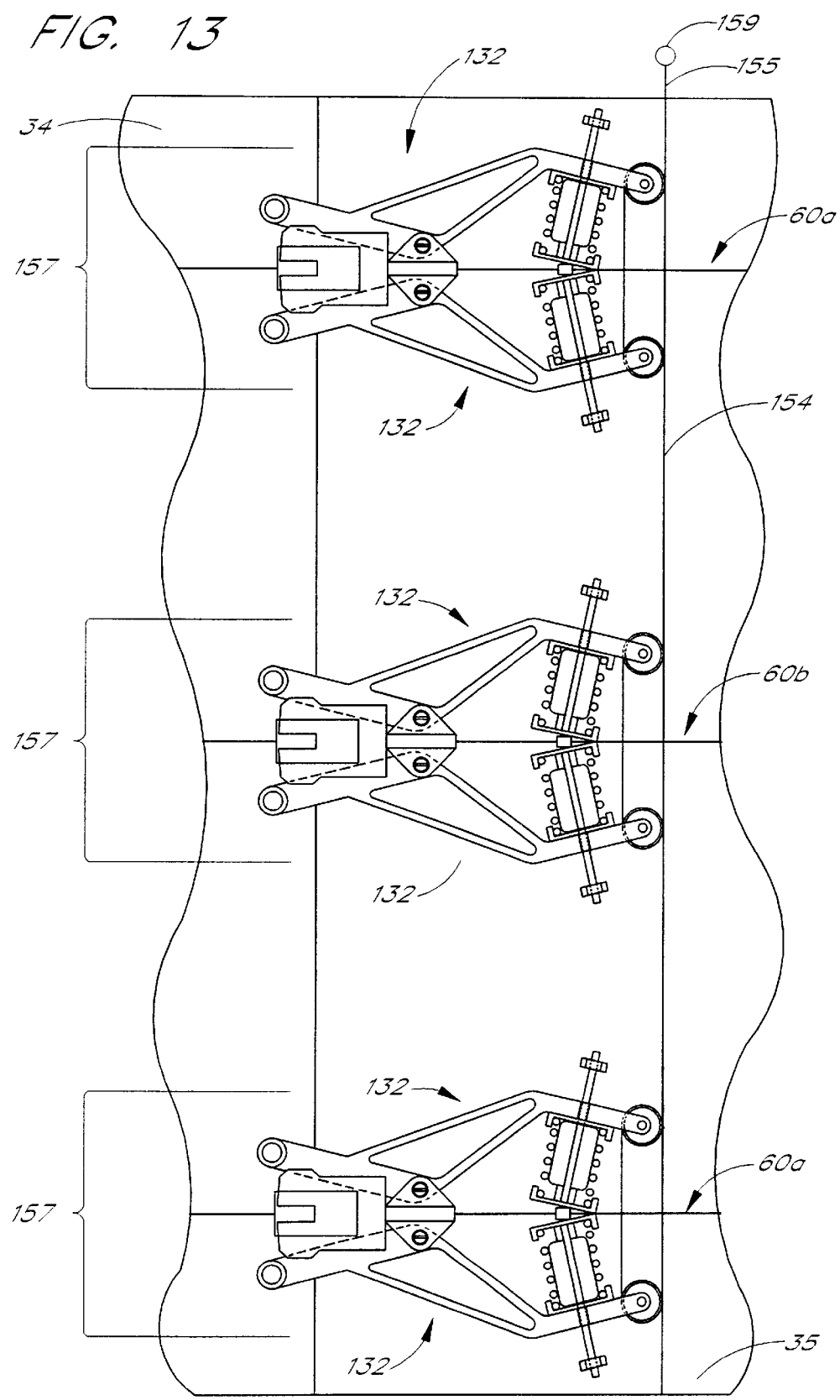
FIG. 13 is bottom plan view of the panel array along the direction of line 13—13 on FIG. 5.

FIG. 13 is a bottom plan view of the panel array 32 showing a preferred embodiment of the arrangement of the latches 132 thereon. The latches 132 are preferably disposed in pairs 157 on each of the struts 60. Preferably, the pulleys 141 are generally aligned within a common plane. A single band or cord is 154 is threaded through each of the pulleys 141 in such a manner that the cord 154 is tightly looped between each of the pulleys 141 in a common pair 157. An end 155 of the cord 154 is attached to an attachment member 159 (shown schematically) to maintain the cord 154 in tight engagement with the pulleys 141. The single cord 154 thus maintains all of the latches 132 in the cocked position. The cord 154 may be released to cause each of the latches to move to the latched position upon occurrence of a single event a single event.

Figure 14:
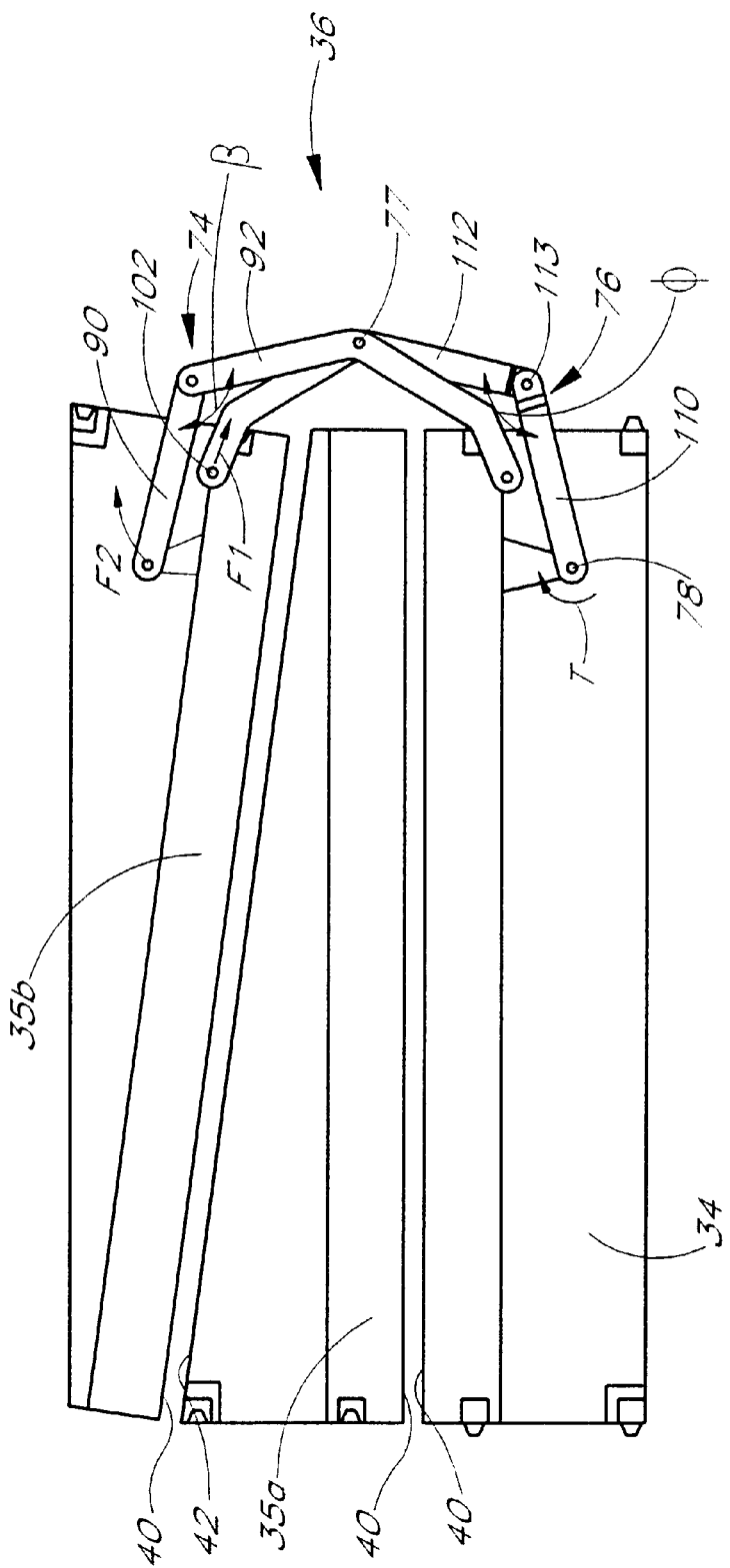
FIG. 14 is a schematic side elevational view of the panel array in the folded state.

In operation, the hinge assemblies 36 are configured to provide a swinging force to the outer panels 35 so that the outer panels 35 rotatably move from the folded state to the extended state. The rotational movement of one of the outer panels 34b is described with reference to FIGS. 14–17, which are schematic side elevational views of the panel array 32. FIG. 14 shows the panel array 32 in the fully folded state. In the illustrated embodiment, spaces are shown between the active surfaces 40 and rear surfaces 42 of the panels 34, 35. It will be appreciated, however, that the surfaces may also be juxtaposed flush against one another when the panel array 32 is in the folded state. Additionally, a hinge assembly 36 is not shown between the center panel 34 and the outer panel 35a, although a hinge assembly 36 also rotatably couples these panels to one another.

With reference, to FIG. 14, the drive shaft 106 applies a torque T to the first end 78 of the first link 110 of the inboard arm 76. The first link 110 exerts a downward pulling force on the second link 112 via the pin connection 113. The second link 112 thereby exerts an outwardly-directed force F1 on the outer panel 34b so that the outer panel 35b begins to slide away from the center panel 34. The bent shape of the second link 112 advantageously facilitates movement of the outer panel 34b in the outward direction. An angle $\phi$ is defined between the first link 110 and the second link 112. The inboard arm 76 also applies a force to the second link 92 of the outboard arm 74 at the pivot connection 77. The first link 90 of the outboard arm 74 then exerts a force F2 on the outer panel 35b. Advantageously, the force F2 tends to lift the outer panel 35b upwardly with respect to the inboard panel 34. The outer panel 35b thus begins to rotate about an instantaneous axis of rotation which is generally aligned with the inboard edge 46 thereof.

Figure 15:
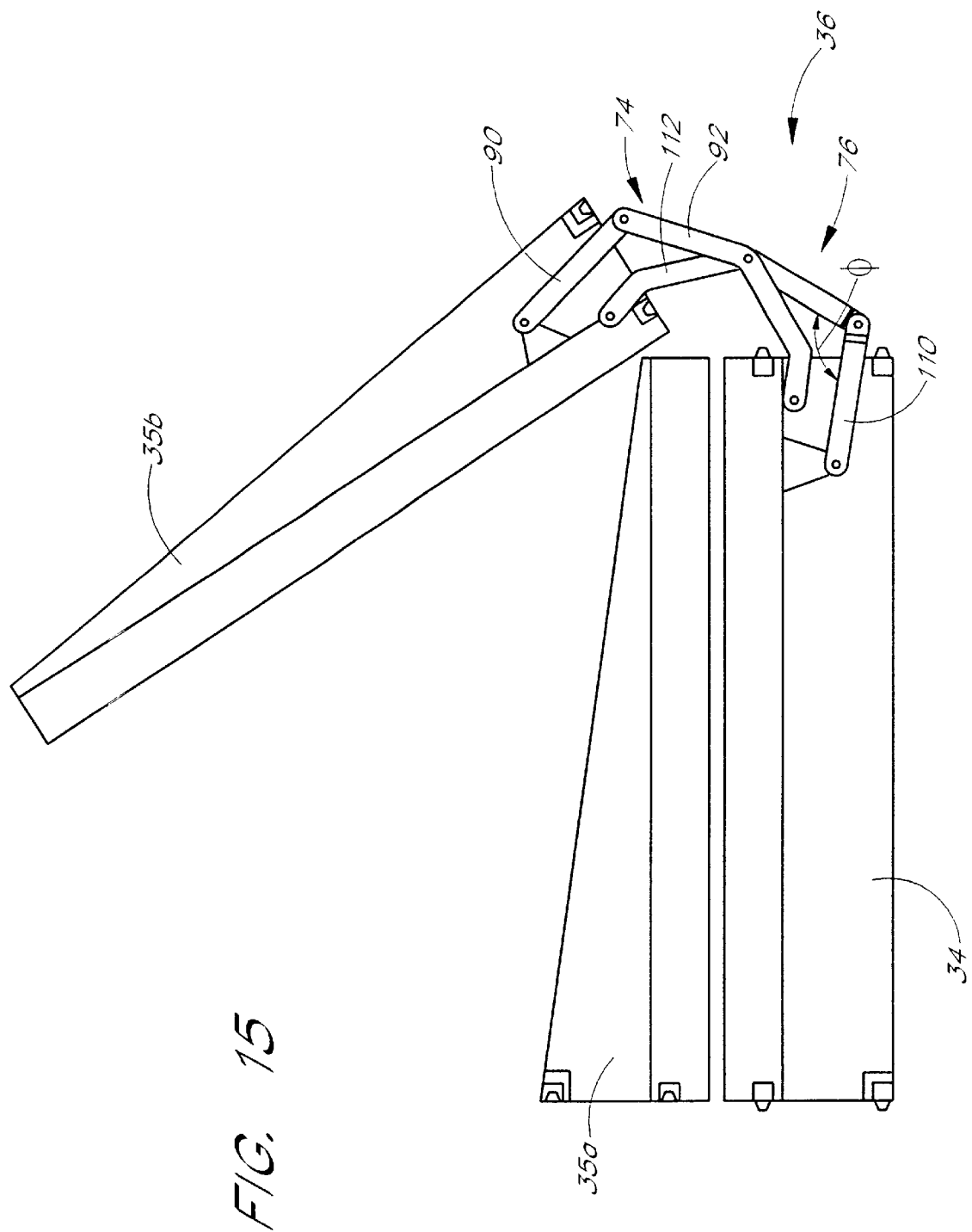
FIG. 15 is a schematic side elevational view of the panel array in a partially folded state.

FIG. 15 shows the panel array 32 in a semi-folded state wherein the hinge assembly 36 has lifted the outer panel 35b outwardly and upwardly with respect to he center panel 34. The coupling of the inboard arm 76 and outboard arm 74 at the pivot connection 77 and the respective shapes thereof are such that the position of the instantaneous axis of rotation has moved with respect to a previous instantaneous axis of rotation. The location of the instantaneous axis of rotation therefore varies as the panel array 32 unfolds. The inboard and outboard arms 74, 76 continue to exert a force on the outer panel 35b to further rotate the outer panel 35b about the axis 50. In the inboard arm 76, the second link 112 begins to rotatably move toward the first link 110 so that the angle $\phi$ therebetween is gradually reduced and the outer panel 35b is pulled downward with respect to FIG. 15.

Figure 16:
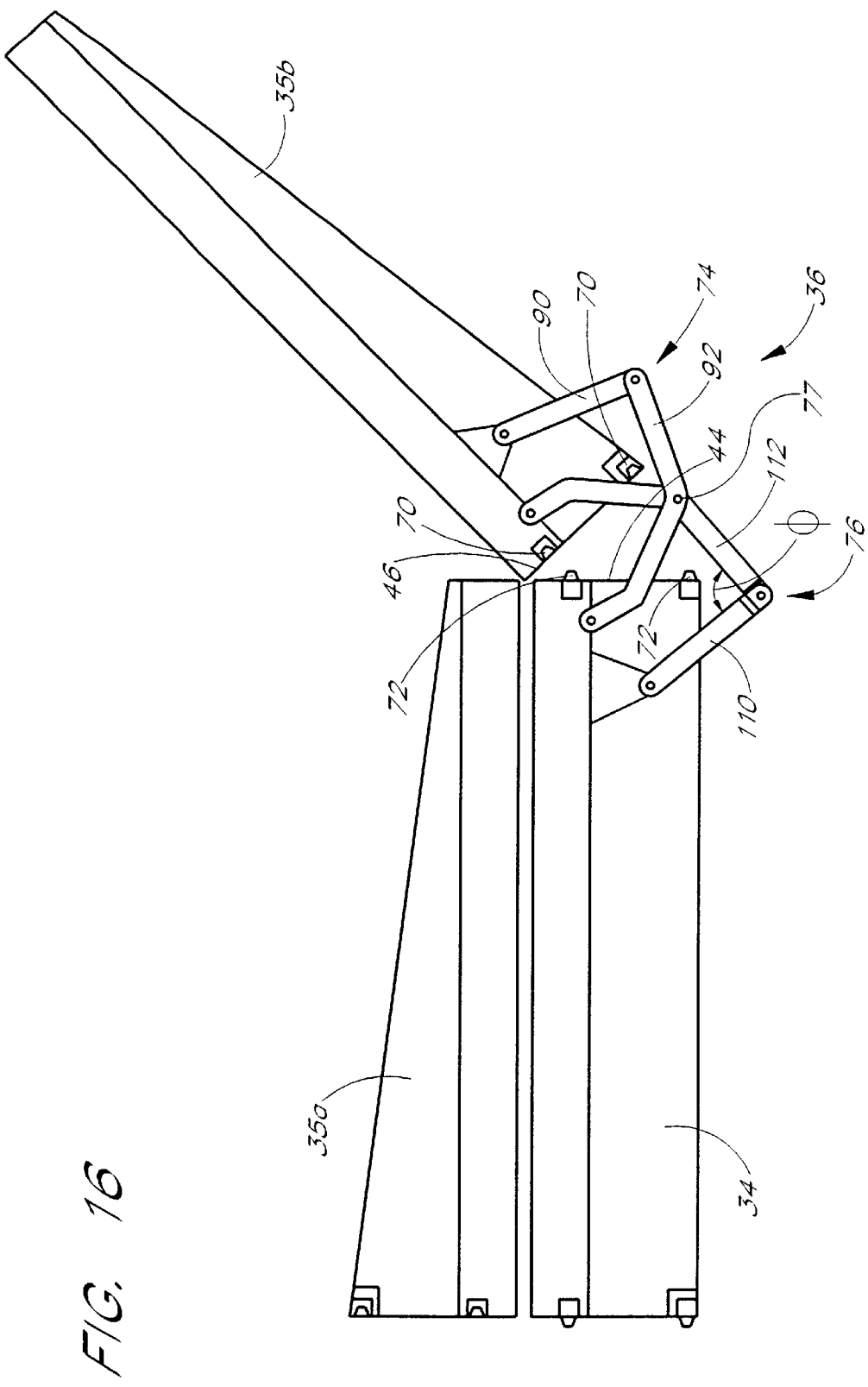
FIG. 16 is a schematic side elevational view of the panel array in a partially folded state.

FIG. 16 shows the panel array 32 in a state wherein hinge assemblies 36 have rotated the outer panel 35b to a position wherein the inboard edge 46 of the outer panel 35b is moving toward the outboard edge 44 of the center panel 34. The angle $\phi$ between the first and second arms 110, 112 of the inboard arm 76 is further reduced so that the first link 110 of the inboard arm begins to pull the second link 112 in the inboard direction. The inboard arm 76 thus exerts a force on the outer panel 35b that draws the inboard edge 46 of the outboard panel 35b toward the outboard edge 44 of the center panel 34. The inboard arm 76 also pulls the outboard arm 74 at the pin connection 77. The second link 92 of the outboard arm draws the first link 90 downward, resulting in a downward movement of the outer panel 35b. The outer panel 35b is thus moving downwardly and inboardly toward the fully extended position.

Preferably, the struts 60 align with one another when the panel array 32 is extended. As mentioned, the interlocking alignment interface facilitates proper alignment of the struts 60 as the panel array 32 transitions from the folded state to the extended state. With reference to FIG. 16, the cones 72 on the outer panel 35b are moving into engagement with the cavities 70 on the center panel 34. Preferably, the cones 72 gradually slide into the cavities 70 as the panel array 32 extends to facilitate proper alignment of the struts 60.

Figure 17:
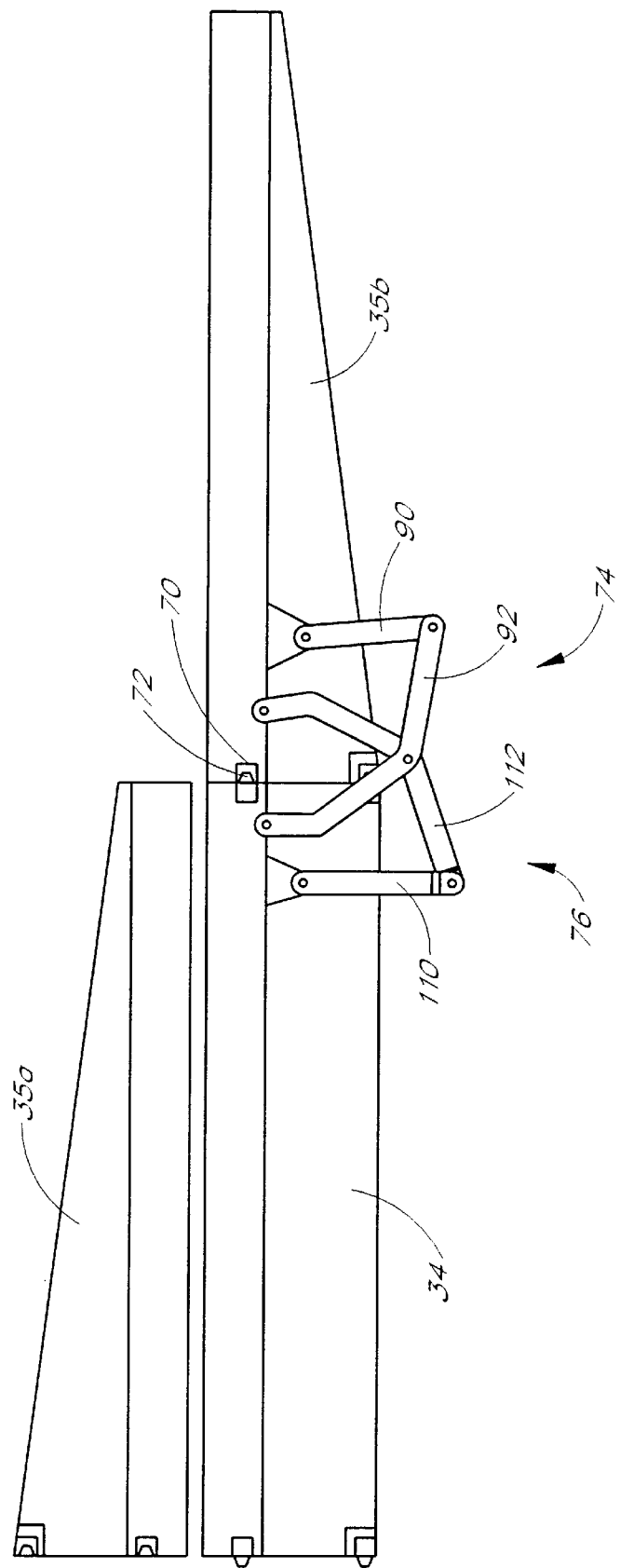
FIG. 17 is a schematic side elevational view of the panel array in the fully extended state.

FIG. 17 shows the panel array 32 in the fully extended state. The cones 72 are preferably fully inserted into or engaged with the cavities 70 so that the outer panel 35b properly aligns with the center panel 34. After the panel 35b has been fully extended, power to the drive shaft 106 is preferably removed so that the hinge assemblies 36 no longer exert a force on the outer panel 35b. As mentioned, the outer panel 35a is preferably also equipped with a hinge assembly 36 so that the outer panel 35a may now be rotated to the extended state. Advantageously, the active surfaces 40 of the panels 34, 35 are aligned coplanar and entirely unobstructed by the hinge assemblies 36, which are positioned entirely outside of a plane defined by the active surfaces. Additionally, unlike currently-used pin hinge assemblies, the assemblies 36 described herein provide rotation about an axis where hinge hardware is not present.

As described above with respect to FIGS. 10–12, the latching mechanism 130 is preferably activated after the panel array 32 has been fully extended. The latches 132 move to the latched position and engage the hook assemblies 134 to secure the struts 60 to one another. The latching mechanism 130 thereby exerts an axial force on the struts 60 to enhance the rigidity of the panel array 32 when fully extended.

Although the foregoing description of the preferred embodiment of the invention has shown, described, and pointed out certain novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited by the foregoing discussion, which is intended to illustrate rather than limit the scope of the invention.

What is claimed is:

1. A deployable panel array, comprising:

a first arm rotatably coupled to a rear surface of a first panel, the first arm also rotatably coupled to a rear surface of a second panel;

a second arm rotatably coupled to the rear surface of the second panel, the second arm also rotatably coupled to the rear surface of the first panel, the second arm and the first arm being rotatably coupled to one another;

a motor drivingly coupled to the first arm and the second arm;

wherein the first and second arms are configured to rotate the first panel relative to the second panel about a non-fixed axis of rotation.

2. The panel array of claim 1, additionally comprising a male member disposed on the first panel and a female member disposed on the second panel, the female member being dimensioned to receive the male member therein, wherein the male member mates with the female member when the first and second panels are in a deployed state.

3. The panel array of claim 1, additionally comprising a latch assembly comprising:

a plurality of latching members on the first panel;

a plurality of hook members on the second panel; and an actuator configured to cause each of the latching members to couple with each of the hook members when the first and second panels are in a deployed state.

4. A panel array, comprising:

at least a first panel defining a front surface and a rear surface;

at least a second panel defining a front surface and a rear surface, the first and second panels being rotatably coupled to one another and moveable between a first position wherein the front surfaces are juxtaposed and a second position wherein the front surfaces are aligned within a common plane;

at least one hinge assembly rotatably coupling the first panel to the second panel, the at least one hinge assembly being positioned entirely outside the common plane and on the same side of the common plane as the rear surfaces of the first and second panels when the first and second panels are in the second position; and a motor drivingly coupled to the at least one hinge assembly.

5. The panel array of claim 4, wherein the first and second panels comprise antennas.

6. The panel array of claim 4, additionally comprising a male member disposed on the first panel and a female member disposed on the second panel, the female member being dimensioned to receive the male member therein, wherein the male member mates with the female member when the first and second panels are in the second position.

7. The panel array of claim 4, additionally comprising:

a third panel having a front surface and a rear surface, the third panel being rotatably coupled to the first panel, the first, second and third panels being movable to a second position wherein the front surfaces of the panels are aligned within a common plane;

at least one second hinge assembly rotatably coupling the third panel to the first panel, said at least one second hinge assembly being positioned entirely outside the common plane when the first and second panels are in the second position.

8. The panel array of claim 4, additionally comprising a latch assembly comprising:

a plurality of latching members on the first panel;

a plurality of hook members on the second panel;

an actuator configured to cause each of the latching members to couple with each of the hook members when the first and second panels are in the second position.

9. A spacecraft, comprising:

at least a first panel defining a front surface and a rear surface;

at least a second panel defining a front surface and a rear surface, wherein the first and second panels are movable between a folded position wherein the front surfaces are juxtaposed and a deployed position wherein the front surfaces are substantially aligned within a common plane; and means for rotating the second panel relative to the first panel about a nonfixed axis of rotation.

10. The spacecraft of claim 9, wherein the means for rotating comprises first and second arms rotatably coupled at opposite ends to the rear surfaces of the first and second panels, the first and second arms being rotatably coupled to one another.

11. The spacecraft of claim 10, wherein the first and second arms are disposed entirely outside the common plane when the first and second panels are in the deployed position.

12. A spacecraft, comprising:

a panel array comprising a first panel having a rear surface and a front surface, and a second panel having a rear surface and a front surface; and at least one hinge mechanism rotatably coupling the first panel to the second panel, the at least one hinge mechanism configured to move the panel array between a folded state wherein the first and second panels are stacked atop one another and the front surfaces of the first and second panels face one another and an extended state wherein the first and second panels are disposed edge-to-edge such that the front surfaces collectively define a common, uninterrupted plane, the at least one hinge mechanism being disposed entirely on the same side of the common plane as the rear surfaces of the first and second panels.

13. The spacecraft of claim 12, wherein the first and second panels comprise solar panels.

14. The space craft of claim 12, wherein the first and second panels comprise antennas.

15. The spacecraft of claim 12, additionally comprising a motor drivingly coupled to the at least one hinge mechanism.

16. A hinge mechanism deploying a first satellite panel relative to a second satellite panel, comprising:

a pair of arms each rotatably coupled at opposite ends to the first panel and the second panel, the pair of arms configured to apply a force to the first and second panels so that the first panel rotates relative to the second panel about a non-fixed axis of rotation;

at least two latch mechanisms coupling the first panel to the second panel, the latch mechanisms each movable to a locked state wherein the latch mechanisms secure the first and second panels in a deployed positions; and an actuator coupled to each of the latch mechanisms, the actuator configured to move the latch mechanisms to the locked state.

17. A panel array for a spacecraft, comprising:
a first panel;
a second panel coupled to the first panel, the first and second panels movable between a folded position wherein the first and second panels are stacked atop one another and a front surface of the first panel faces a front surface of the second panel, and a deployed position wherein the first and second panels are substantially aligned within a common plane;
at least two latch mechanisms coupling the first panel to the second panel, the at least two latch mechanisms each movable to a locked state wherein the at least two latch mechanisms secure the first and second panels in the deployed position; and
an actuator configured to move the at least two latch mechanisms to the locked state upon occurrence of a single event.

18. The panel array of claim 17, wherein the at least two latch mechanisms comprise a latch on one of the first and second panels and a hook on the other of the first and second panels, the latch configured to latch onto the hook when the at least two latch mechanisms are in the locked state.

19. A method of moving a spacecraft panel array between a folded state and a deployed state, comprising:
positioning an active surface of a first panel in a juxtaposed relationship with an active surface of a second panel;
rotating the first panel relative to the second panel about a non-fixed axis of rotation until the active surface of the first panel is coplanar with the active surface of the second panel.

20. The method of claim 19, additionally comprising applying a preload between the first panel and the second panel when the active surface of the first panel is coplanar with the active surface of the second panel.

21. A deployable mechanism for use in space, comprising:
a first panel having a first surface and a second surface;
a second panel having a first surface and a second surface; and
a hinge mechanism for the deployment of the first panel relative to the second panel from a folded position to a deployed position, wherein the first surface of the first panel and the first surface of the second panel face one another in the folded position and when in the deployed position the first surface of the first panel and the first surface of the second panel form a working surface, said hinge mechanism being disposed entirely on the opposite side of the first panel and the second panel as said working surface.

22. A deployable mechanism as in claim 21 wherein the hinge mechanism is disposed to the same side of the working surface as is the second surface of the first panel when the first panel is in the deployed position.

23. A deployable mechanism for use in space, comprising:
a first panel having a first surface and a second surface;
a second panel having a first surface and a second surface; and
a hinge mechanism, wherein the hinge mechanism allows the deployment of the first panel relative to the second panel from a folded position to a deployed position, where the first surface of the first panel and the first surface of the second panel are aligned in the deployed position and form a substantially continuous surface uninterrupted by the hinge mechanism, wherein the hinge mechanism provides a non-fixed axis of rotation between the first panel and the second panel.

24. A deployable mechanism as in claim 23 wherein the hinge mechanism is disposed to the same side of the substantially continuous surface as is the second surface of the first panel when the first panel is in the deployed position.

25. A deployable mechanism as in claim 23 further comprising a motor drivingly coupled to the hinge mechanism.

26. The deployable mechanism of claim 23 further comprising:
a third panel having a first surface and a second surface; and
a second hinge mechanism, wherein the second hinge mechanism allows the deployment of the third panel relative to the second panel from a folded position to a deployed position, where the first surface of the second panel and the first surface of the third panel are aligned in the deployed position and form a substantially continuous surface uninterrupted by the second hinge mechanism.

27. A panel array for use in space, comprising:
at least a first panel defining a first surface and a second surface;
at least a second panel defining a first surface and a second surface, the first and second panels being rotatably coupled to one another and moveable between a first position wherein the first surfaces are juxtaposed and a second position wherein the first surfaces are aligned to form a working surface; and
at least one hinge assembly rotatably coupling the first panel to the second panel, the at least one hinge assembly being positioned entirely outside the working surface when the first and second panels are in the second position wherein the at least one hinge assembly is disposed on the same side of the working surface as the second surface of the first panel when the array is in the second position.

28. A panel array as in claim 27 further comprising a motor drivingly coupled to the at least one hinge assembly.

29. A panel array as in claim 27 wherein the first surfaces of the first and second panels collectively define a common, uninterrupted plane in the second position.

30. The panel array of claim 27 further comprising:
a third panel having a first surface and a second surface, the second and third panels being rotatably coupled to one another and movable between a first position wherein the first surfaces of the second and third panels face one another and the first panel is disposed between the second and third panels, and a second position wherein the first surfaces of the second and third panels are aligned to form a working surface; and
a second hinge assembly rotatably coupling the second panel to the third panel.

31. A panel array for use in space, comprising:
at least a first panel defining a first surface and a second surface;
at least a second panel defining a first surface and a second surface, the first and second panels being rotatably coupled to one another and moveable between a first position wherein the first surfaces are juxtaposed and a second position wherein the first surfaces are aligned to form a working surface; and
at least one hinge assembly rotatably coupling the first panel to the second panel, the at least one hinge assembly being positioned entirely outside the working surface when the first and second panels are in the second position wherein the at least one hinge assembly provides a non-fixed axis of rotation between the first panel and the second panel.

32. A panel array as in claim 31 further comprising a motor drivingly coupled to the at least one hinge assembly.

33. A panel array as in claim 31 wherein the working surface comprises a substantially uninterrupted plane.

34. The panel array of claim 31 further comprising:

a third panel having a first surface and a second surface, the second and third panels being rotatably coupled to one another and movable between a first position wherein the first surface of the third panel is juxtaposed with the second surface of the first panel, and a second position wherein the first surface of the third panel and the first surface of the second panel collectively define a common, uninterrupted plane; and a second hinge assembly rotatably coupling the third panel to the second panel.

* * * * *